United States Patent
Hernández Hernández et al.

(10) Patent No.: US 10,838,084 B2
(45) Date of Patent: Nov. 17, 2020

(54) READ NETWORK TOPOLOGY

(71) Applicants: General Equipment for Medical Imaging, S.A., Valencia (ES); Bruker Switzerland AG, Fällanden (CH); Consejo Superior de Investigaciones Cientificas, Madrid (ES); Universitat Politècnica de Valencia, Valencia (ES)

(72) Inventors: Liczandro Hernández Hernández, Valencia (ES); Antonio Javier González Martínez, Valencia (ES); Albert Aguilar Talens, Valencia (ES); José María Benlloch Baviera, Valencia (ES); Noriel Pavón Hernández, Valencia (ES)

(73) Assignees: General Equipment for Medical Imaging, S.A. (ES); Universitat Politècnica de Valencia (ES); Consejo Superior de Investigaciones Cientificas (ES); Bruker Switzerland AG (CH)

( * ) Notice: Subject to any disclaimer, the term of this patent is extended or adjusted under 35 U.S.C. 154(b) by 149 days.

(21) Appl. No.: 16/021,370

(22) Filed: Jun. 28, 2018

(65) Prior Publication Data
US 2019/0004188 A1 Jan. 3, 2019

Related U.S. Application Data

(63) Continuation of application No. PCT/ES2016/070950, filed on Dec. 30, 2016.

(30) Foreign Application Priority Data
Dec. 31, 2015 (ES) .................................. 201531953

(51) Int. Cl.
| | |
|---|---|
| G01T 1/208 | (2006.01) |
| G01T 1/20 | (2006.01) |
| H04N 5/378 | (2011.01) |
| G01T 1/17 | (2006.01) |
| G01T 1/164 | (2006.01) |
| G01T 1/28 | (2006.01) |

(52) U.S. Cl.
CPC ............ *G01T 1/208* (2013.01); *G01T 1/1642* (2013.01); *G01T 1/17* (2013.01); *G01T 1/2018* (2013.01); *G01T 1/28* (2013.01); *H04N 5/378* (2013.01)

(58) Field of Classification Search
CPC ....... G01T 1/208; G01T 1/2895; G01T 1/248; G01T 1/17; H04B 5/378
See application file for complete search history.

(56) References Cited

U.S. PATENT DOCUMENTS 3,821,552 A * 6/1974 Hermeyer ................ H05G 1/44
250/388
5,347,590 A * 9/1994 Nonnweiler .............. G06T 5/20
348/E5.086

(Continued)

OTHER PUBLICATIONS

Siegel et al.; Simple Charge Division Readouts for Imaging Scintillator Arrays using a Multi-Channel PMT; IEEE Transactions on Nuclear Science, vol. 43, No. 3, pp. 1634-1641, Jun. 1996—(8) pages.

(Continued)

*Primary Examiner* — Yara B Green
(74) *Attorney, Agent, or Firm* — Boyle Fredrickson, SC

(57) ABSTRACT

A read network topology for a matrix output device with a number of outputs determined by cross-joining "m" rows and "n" columns comprises a basic filtering block replicated for all the outputs and separately assigned to each of the outputs; each filtering block contains two filtering circuits (Continued)

that have a common input connection to the assigned matrix output and that provide two separate symmetrical and filtered outputs; all the row outputs (i) from the same row "i" but from different columns are interconnected to an input of an amplifier linked to row "i", and all the column outputs (j) from the same column "j" but from different rows are connected together to an input of an amplifier linked to column "j", the complete topology appearing when "i" and "j" are expanded in the respective intervals thereof.

20 Claims, 15 Drawing Sheets

(56) References Cited

U.S. PATENT DOCUMENTS

| 5,708,269 | A | * | 1/1998 | Meissner | G01J 5/22 |
| | | | | | 250/332 |
| 6,747,263 | B1 | | 6/2004 | Popov | |
| 7,476,864 | B2 | | 1/2009 | Benlloch Baviera et al. | |
| 8,884,240 | B1 | | 11/2014 | Shah et al. | |
| 8,886,697 | B2 | | 11/2014 | Dolinsky | |
| 2011/0108702 | A1 | * | 5/2011 | Jackson | G01T 1/248 |
| | | | | | 250/207 |
| 2013/0293296 | A1 | | 11/2013 | Proffitt | |
| 2015/0049340 | A1 | * | 2/2015 | Schneider | G01B 9/02083 |
| | | | | | 356/479 |
| 2015/0285922 | A1 | * | 10/2015 | Mintzer | G01T 1/208 |
| | | | | | 600/411 |

OTHER PUBLICATIONS

Gonzalez et al.; Performance Study of a Wide-Area SiPM Array, ASICs Controlled; IEEE Transactions on Nuclear Science, vol. 62, No. 1, pp. 19-26, Feb. 2015—(8) pages.

Gonzalez et al.; Simulation Study of Resistor Networks Applied to an Array of 256 SiPMs; IEEE Transactions on Nuclear Science, vol. 60, No. 2, pp. 592-598, Apr. 2014—(7) pages.

* cited by examiner

READ NETWORK TOPOLOGY

CROSS-REFERENCE TO RELATED APPLICATIONS

This application is a continuation of and claims priority to PCT Application No. PCT/ES2016/070950, filed Dec. 30, 2016, which, in turn, claims priority to Spanish Application No. P201531953, filed Dec. 31, 2015, the entire contents of each application is incorporated herein by reference.

FIELD OF THE INVENTION

The present invention refers to a readout network topology for matrix output devices useful in different sectors, and especially in the field of nuclear medicine.

BACKGROUND OF THE INVENTION

The present invention relates to a readout system for a Matrix Output Device (MOD), that provides appropriate filtering of sensor output noise and avoids signal mixing of the different sensor outputs preserving the useful part of the signals in a way that it can be possible to reproduce the distribution of sensor output signals across the matrix, requiring substantially less amplifiers than other traditional readout systems that used to amplify every output channel.

Position Sensitive Photo-Multiplier Tubes (PSPMT) are well known MOD in the art. These have a photosensitive matrix output that converts light photons into electrical currents. The main components of a PSPMT are an input window, a photocathode, focusing electrodes, dynodes and an anode. The photocathode is used for converting incoming light (photons) into electrons. These photoelectrons, which are a product of the photoelectric effect, are directed by the voltage of focusing electrodes towards dynode stages. The dynodes are used to multiply the electrons by the process of secondary electron emission. Electron gains ranges from $10^3$ to $10^8$ depending on the number of dynode stages and interdynode voltages of the PSPMT. The main electrical difference between a not position sensitive Photo-Multiplier Tube (PMT) and a PSPMT is that this last one provides multiple outputs in matrix form, that are activated emulating the same geometrical position of the impinging photon (Gamma or X-Ray) at the photocathode surface.

Each PSPMT matrix output has the behavior, of a charge source or a current source depending of the way the light reaches the detector surface.

In general the PSPMTs can be read and digitized at every matrix output, but this requires a high number of electronic channels to be processed. Often, an intermediate readout circuit is used to reduce the number of electronic channels to process [U.S. Pat. No. 6,747,263 (Popov)]. Usually, after the readout circuit the signals are acquired, digitized and a Center of Gravity (COG) algorithm is used to provide the planar coordinates of the center of light distribution on the photocathode [S. Siegel et al "Simple Charge Division Readouts for Imaging Scintillator Arrays using a Multi-Channel PMT", IEEE TNS, Vol 43, No 3, p. 1634, June, 1996], (Siegel).

Some advanced readout electronics are able to provide, not only the center of light distribution, but also information about the shape of light distribution, permitting further analysis like Depth Of Interaction (DOI) determination [U.S. Pat. No. 7,476,864 (Christoph)].

In recent years a new type of light detector called Silicon Photo Multiplier (SiPM) has appeared. These detectors have an internal microscopic matrix of photodiodes small enough to assume that these will mostly capture individual photons at each photodiode. When an individual photodiode is reached by one or more photons it changes to its activated state, generating a fixed current independently of how many photons activate it. The SiPM adds all the similar photodiodes outputs providing a fast analog output proportional to the number of activated photodiodes, which corresponds approximately with the number of photons impinging the SiPM.

The SiPM output can be the anode or the cathode, depending of the device bias polarity.

Novel SiPMs are becoming more used in several applications to accurately detect visible light, for instance, scintillation light, and some research groups and companies, as well as the SiPM manufacturers, began to create devices containing large Arrays of SiPMs, that we call SiPMA, fixed in matrix configurations with a topology similar to the one of the PSPMTs, and often with similar dimensions, to take advantage of any possible systems compatibility, creating an advantageous substitutive component for the standard MODs, (the PSPMTs), with faster response among other benefits. As the PSPMTs are normally connected to the acquisition systems by means of readout circuits to reduce the required channels, similar or equivalent circuits are required for the SiPMAs.

In the same sense of the PSPMT, the SiPMA matrix outputs have the behavior of charge sources or a current sources, depending of the way the light reaches the detector surface, so, in this specification we will assume and represent the matrix outputs indistinctly as charge or current sources.

It is important to note a relevant difference between PSPMTs and SiPMAs, regarding the intrinsic noise of their respective detection units, i.e. PSPMT individual output anode PAD and individual SiPMs: The noise of a SiPM is some orders higher than noise of a single PMT anode PAD, creating some constrains for the circuits connected to the matrix outputs, and it is more relevant in those detector configurations that produce output signals close to the intrinsic noise of the SiPMs.

We reviewed all the available readout networks for MODs, and tested these for the specific case of the detector block conformed by SiPMAs coupled to continuous scintillator crystal. The results were not good and we concluded that those readout networks are not suitable for this new type of detector block.

The noise in electronic systems is usually treated with filtering circuitry. These can be passive filters or active filters that also can be classified as high pass, band pass, low pass and notch filters, according to the frequency attenuation shape produced. The passive ones are designed to produce amplitude reduction of the noisy signals, but these produce some amplitude reduction in the useful signal too. On the contrary, the use of active filters avoids the amplitude reduction in the useful signal and produces better signal to noise ratio. A typical single stage active filter includes a passive component (i.e. capacitor, resistor, . . . ) at the negative input of an operational amplifier (OpAmp) and another passive component (i.e. resistor, capacitor, . . . ) in the feedback loop of the OpAmp. If we want to actively filter a defined quantity of signals, we normally require the same number of active filters, while each active filter requires an OpAmp with its biasing circuitry, a feedback loop passive component and a passive component at input. These different active filters will have their own different outputs, so that, if it is necessary to add a group of them, a further additional circuit is required.

Although MODs have an uncountable number of outputs, in the present invention we will show a filtering and adding circuit that permits to filter all the MOD outputs in a similar way as described above, doing the active filtering and the adding process in a single stage that furthermore shares the same OpAmp for a group of noisy input signals. In this way it is possible to use a limited number of OpAmps, quite low compared to the number of processed MOD outputs.

In U.S. Pat. No. 6,747,263, Popov describes a simple network that maintains isolated each matrix output while extracts its signals simultaneously, to its corresponding row and column outputs of the whole circuit. This circuit suits very well the PSPMTs functionality due to the very low noise of the PSPMTs anode outputs, which remain low, even after mixing all these in the Popov readout network. Trying to use the Popov network in the new MODs, (the SiPMAs) fails due to the fact that at the end of the rows and columns a lot of noisy signals are added generating a bad signal to noise response in all rows and columns, worsening too much the energy and spatial resolutions among other features of the detector, when compared to a system that processes all matrix outputs individually.

In. US2013/0293296 A1, Proffit proposes a network based on diodes in place of the resistors previously used by Popov with the aim to overcome the noise issues. The diodes have a threshold voltage and it is necessary to overcome it before any signal could travel through the diode, so, this threshold will takes account of the noise, while real signals are high enough to rise over threshold and reach the network output after crossing the diodes.

The problem with Proffit network comes from the diodes behavior. As the diodes will subtract their own thresholds to any signal crossing them, the proportion of signals reduced at the output will be higher if the signals are close to the threshold voltage, but will be negligible if the signals are very high compared to threshold, which is characteristic of the Proffit network, limiting and conditioning its usability.

This type of high level signals can be normally obtained in SiPMA connected to scintillator arrays (made of stacked small pixelated scintillator crystals). When a gamma ray reaches one pixel (among all which are stacked inside the scintillator array), although the light emitted flows everywhere, a lot of photons will go to the side where is attached the SiPMA, but will flow through the single SiPM that is facing the touched crystal (or a very limited quantity of SiPMs in front of that crystal), producing high level signals.

Although, scintillator arrays connected to matrix detectors, either PSPMTs or SiPMAs, are very common, there is a different configuration using a monolithic single (or continuous) crystal connected to those mentioned matrix detectors. This configuration gives exceptional possibilities to determine the Depth Of Interaction of gamma ray in the detector, which is a very important advantage in some applications demanding very high spatial resolution [Christoph], disregarding that the planar resolution is not limited by any pixel size of a crystal array.

The use of continuous crystal coupled to SiPMAs configuration produces some special features in the output signals that is important to take care of, when extracting these signals by any means, including a readout network.

Following the previous description about light travelling in the pixelated crystals, when a gamma ray reaches the monolithic scintillator crystal, again the light emitted flows everywhere, again a lot of photons will go to the side where the SiPMA is attached, but in this case the light will flow through the monolithic crystal reaching all (or almost all) the SiPMs that are distributed along the side of the monolithic scintillator, and sharing the photons among all of them, thus producing a relatively low level signal, compared with the hypothetic signal produced by the same gamma ray reaching a pixelated crystal, although all the signals together, in the configuration with monolithic crystal, make up the equivalent signal for that gamma ray in a configuration with a pixelated crystal.

Some research groups are very active developing the SiPMA technology and attempting to validate different detector configurations, including Popov's, Proffit's networks among others. [A. González. et al. "Simulation Study of Resistor Networks Applied to an Array of 256 SiPMs". Nuclear Science, IEEE Transactions on (Vol: 60, Issue: 2)].

When the SiPMs are arranged in a SiPMA configuration, similar to those of the PSPMT, the designers are tempted to use the same previous readout configurations to extract and process the output signals, but this does not work properly due to the fact that SiPMs are too noisy devices [A. González et al.: Performance study of a Wide-Area SIPM ARRAY, ASICS Controlled. IEEE Transactions on Nuclear Science, Vol. 62, Issue: 1], A new readout network to solve these limitations is needed.

Trying to use the networks described by Siegel or Popov fails in general when using SiPMAs because those networks add or mix all the matrix signals, adding the whole noise and worsening the signal to noise ratio. This is even worse if we use the continuous monolithic crystal plus SiPMA configuration, because with the gamma ray energy distributed across all the SiPMs inside the SiPMA, the individual output signals of the SiPMs are close to noise level and the output signal cannot be distinguished from noise.

The use of Proffit's network solves part of the described problems. In the configurations using SiPMAs plus Pixelated Scintillator Crystals, the gain of the SiPMs can be adjusted so that the noise at all SiPMs can be below diodes threshold, thus enabling signal triggering just when real signals arrive and allowing correct processing of these, although all outputs are affected with distortions in a different way each.

On the contrary, when we try to use the Proffit's network in a detector configuration including a continuous crystal plus a SiPMA, it fails in a similar way that Popov's network. As the signals are shared among all SiPMs in the SiPMA, these are very close to the noise level, and thus are too affected by the diode threshold voltage cut, making very difficult (when not impossible) to process these and obtaining usable data. In this way, a lot of SiPMs elements will lead to null signals, instead to the real values, and the remainders SiPM elements will lead to signals which are reduced in relevant percentages, disregarding that are different percentages for each SiPM output signal.

In the present invention, we filter all the matrix device output signals instead of cutting everything that could be lower than certain threshold, solving the problems cited in the above paragraph regarding the Proffit's network. Furthermore, our invention improves signal to noise ratio on each matrix device output signal compared to the Popov's network, which collects all signals as well as all noises, worsening the possibilities of extracting useful information from the reduced number of outputs of this network.

The filtering capability of the proposed readout network topology, at a very early stage of the signal processing, increases the signal to noise ratio, preserving the useful part of the signal, while reducing the intrinsic noise of the individual SiPMs, before mixing these in the next stages of processing, solving the issues related to noise when using SiPMs and SiPMAs.

When working with matrix signals arriving from SiPMAs coupled to monolithic crystals configurations, the filtered network proposed by the present invention has better performance than the known ones, such as those proposed by Proffit, because both, real signal and noise, cannot be distinguished by their amplitudes, when signal amplitudes are close to noise, such as the case of detector blocks including monolithic scintillator crystals. However, according to the present invention they can always be weel characterized by means of their respective frequencies, without taking into account their amplitudes.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE INVENTION

In order to appropriately deal with the noisy SiPMA output signals, we propose a readout network topology for a Matrix Output Device with a number of outputs given by the cross combination of "m" rows and "n" columns, labeled as Source(i, j), wherein "i" ranges 1 to m and "j" ranges 1 to n, that comprises a basic filtering block, replicated for all the matrix outputs, and separately assigned to each one; each filtering block containing a pair of filtering circuits having a common input connection to its assigned matrix output and providing two separate, symmetrical and filtered outputs labeled Col. (j) and Row(i); all the Row(i) outputs incoming from the same row "i", but different columns are connected together to the low impedance input of an amplifier linked to the "i" row, that completes the active filtering and mixing topology of the whole path, giving the corresponding AmpRow(i) output, and all the Column(j) outputs incoming from the same column "j", but different rows, are connected together to the low impedance input of an amplifier linked to the "j" column, that completes the active filtering and mixing topology of the whole path, giving the corresponding AmpCol(j) output; the complete topology of the readout network appears revealed expanding "i" and "j" to their respective ranges.

According to particular embodiments of the readout network topology the filtering block is made of a pair of CR Filtering Circuits.

According to additional particular embodiments of the readout network topology the filtering block is made of a pair of CL Filtering Circuits.

According to additional particular embodiments the different common outputs of the Filtering blocks, for rows, Row(i), and for columns, Column(j), are connected to amplifier circuits of the types "of charge" or "of current", with low input impedance, compared with the impedance of the Filtering circuit, being at least 10 times lower.

According to additional particular embodiments the different common outputs of the filtering blocks, for rows, Row(i), and for columns, Column(j), are connected to the negative inputs of the amplifier circuits and a resistor is used in the feedback loop between OpAmp output and its negative input.

According to additional particular embodiments the totality of the different common outputs of the Filtering blocks, for rows, Row(i), and for columns, Column(j), represents the totality of outputs of the detector to be digitized.

According to additional particular embodiments the different Amplifier outputs for rows, AmpRow(i) and for columns, AmpCol(j), represent the outputs of the detector to be digitized.

According to additional particular embodiments a first resistor chain interconnects the outputs of all rows AmpRow(i) and a second resistor chain interconnects the outputs of all columns, AmpCol(j); the ends of the resistor chains enable to extract directly, on real time, the "x" and "y" position by means of the COG algorithm. An adding circuit can be provided to add the signals obtained at the different interconnection points of the resistor chain for rows, AmpRow(i) and for columns, AmpCol(j), which represents the second momentum and is a function of the DOI, inside the continuous crystal coupled to the matrix output device.

The present invention also refers to a matrix output device characterized in that it comprises the readout network topology defined above. According to particular embodiments, the device comprising the readout network topology defined, is selected from among SiPMA, PSPMTs and APDs arrays.

According to additional particular embodiments the matrix output device is selected from SiPMA, PSPMTs and APD arrays. An adding circuit can be provided to add the signals obtained at the different interconnection points of the resistor chain for the rows, AmpRow(i) and for the columns, AmpCol(j), which represents the second momentum and is a function of the DOI, inside the continuous crystal coupled to the matrix output device.

According to additional particular embodiments the matrix output device is coupled to continuous monolithic scintillator crystals, or pixelated scintillators. An adding circuit can be provided to add the signals obtained at the different interconnection points of the resistor chain for rows, AmpRow(i) and for columns, AmpCol(j), which represents the second momentum and is a function of the DOI, inside the continuous crystal coupled to the matrix output device.

According to a preferred embodiment of the device comprising the readout network, the matrix output device is coupled to continuous monolithic scintillator crystals, preferably the MOD, is a SiPMA which is coupled to a monolithic crystal.

The present invention also refers to detector block (which can be a X-ray detector or a gamma ray detector characterized in that it comprises a matrix output device comprising the readout network topology defined above.

According to particular embodiments the detector block comprises a matrix output device that is selected from among a SiPMA, PSPMTs and APD arrays.

According to additional particular embodiments of the detector block, the matrix output device is coupled to a monolithic continue scintillation crystal or pixelated scintillation crystal.

According to preferred particular embodiments of the detector block, the matrix output device is a SiPMA and is coupled to a monolithic continue crystal.

The present invention also refers to the use of the readout network topology previously defined or to the use of a device previously defined, or to the use of the detector block defined above, in a process for obtaining images generated by X-ray sources or gamma ray sources.

According to particular embodiments the invention refers to the use of the readout network topology defined or the use of the device previously defined, wherein the device comprises a Silicon Photomultiplier matrix devices connected to monolithic scintillator crystals or to pixelated scintillator crystals.

BRIEF DESCRIPTION OF THE DRAWING(S)

Various exemplary embodiments of the subject matter disclosed herein are illustrated in the accompanying drawings in which like reference numerals represent like parts throughout, and in which:

In the figures "GND" means a ground connection.

Figure 4A:
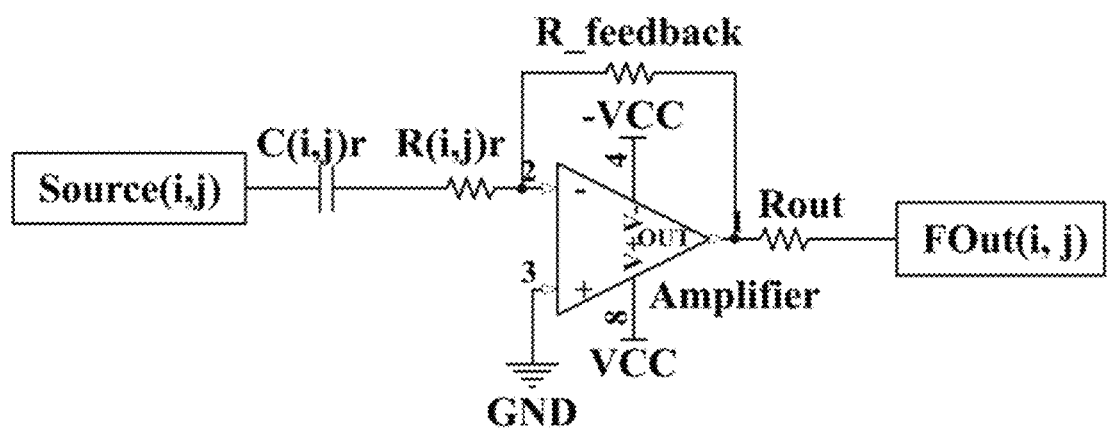
FIG. 4A is a circuit with the typical topology (state of the art) of an active filter, including passive components connected from input, Source(i, j) to the negative input of the Operational Amplifier (OpAmp), labeled as AmplifierA, and a feedback passive component connected from OpAmp output to the negative input of the OpAmp.
Figure 4B:
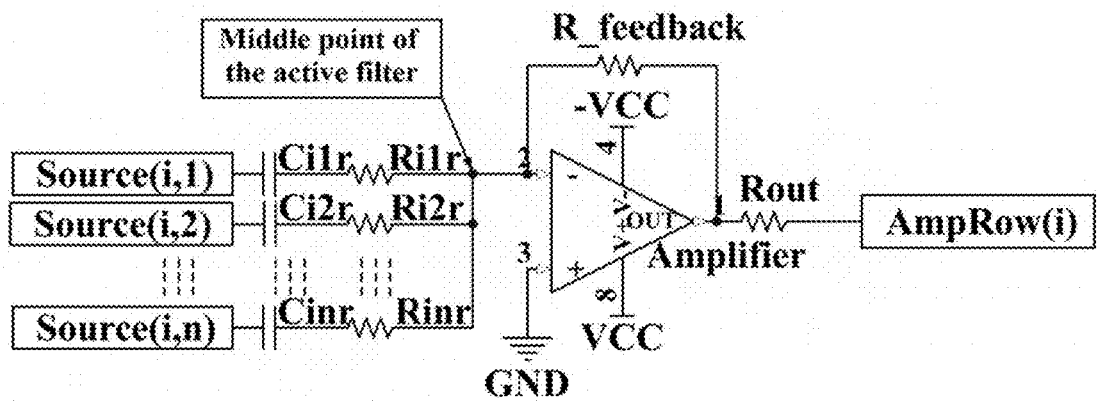
Figure 4C:
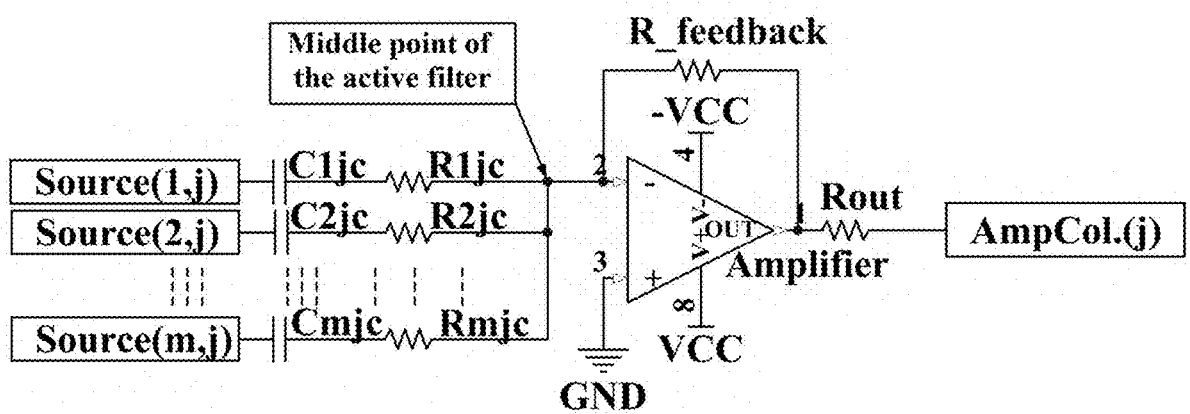
Figure 4D:
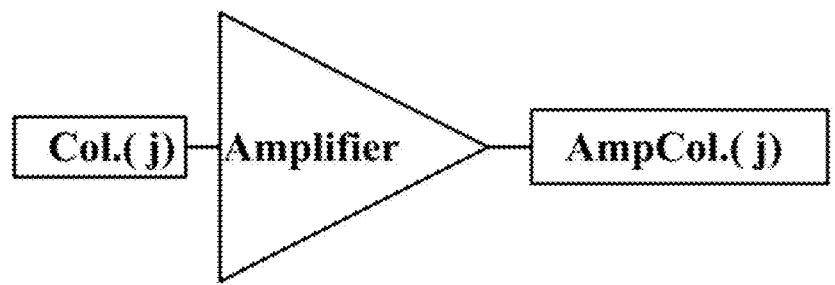
Figure 4E:
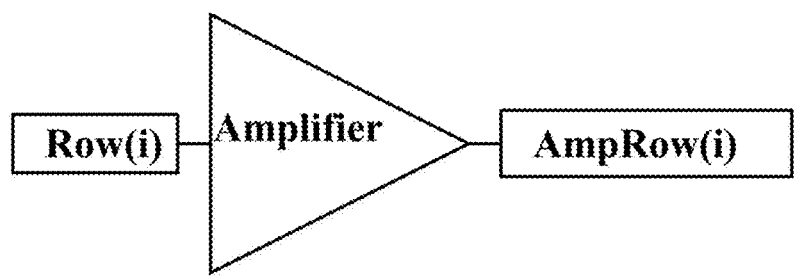
Figure 5A:
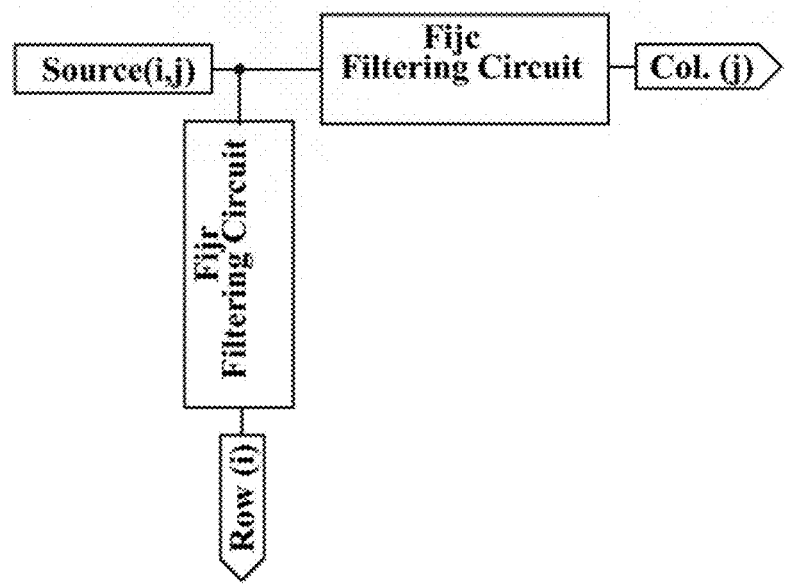
Figure 5B:
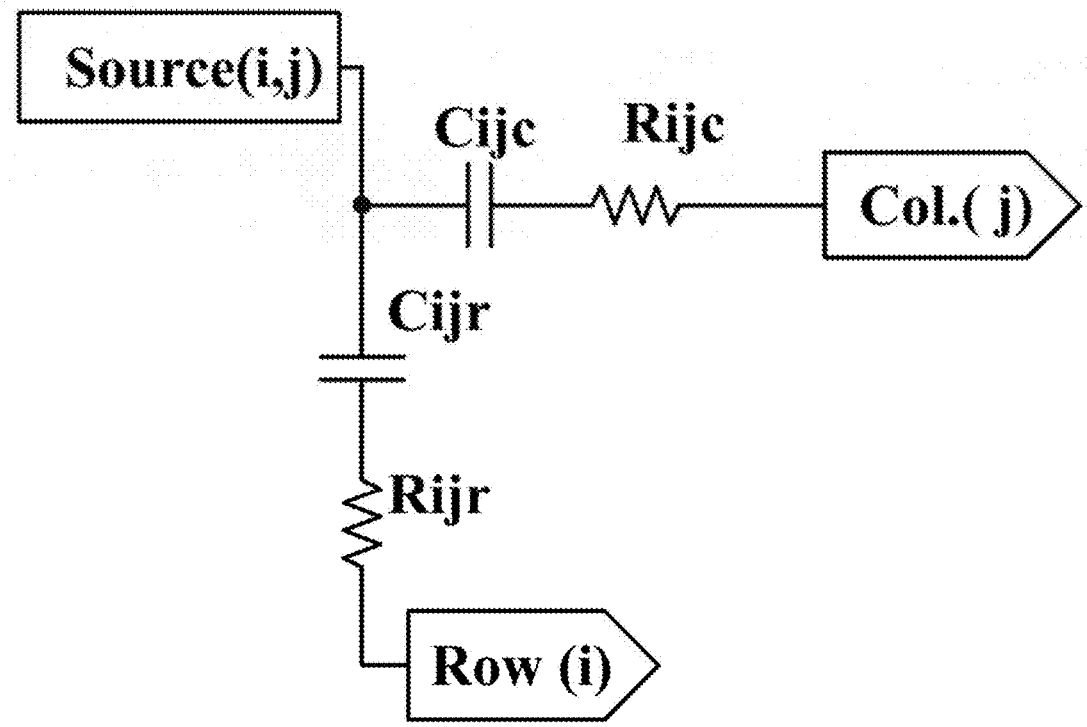
Figure 5C:
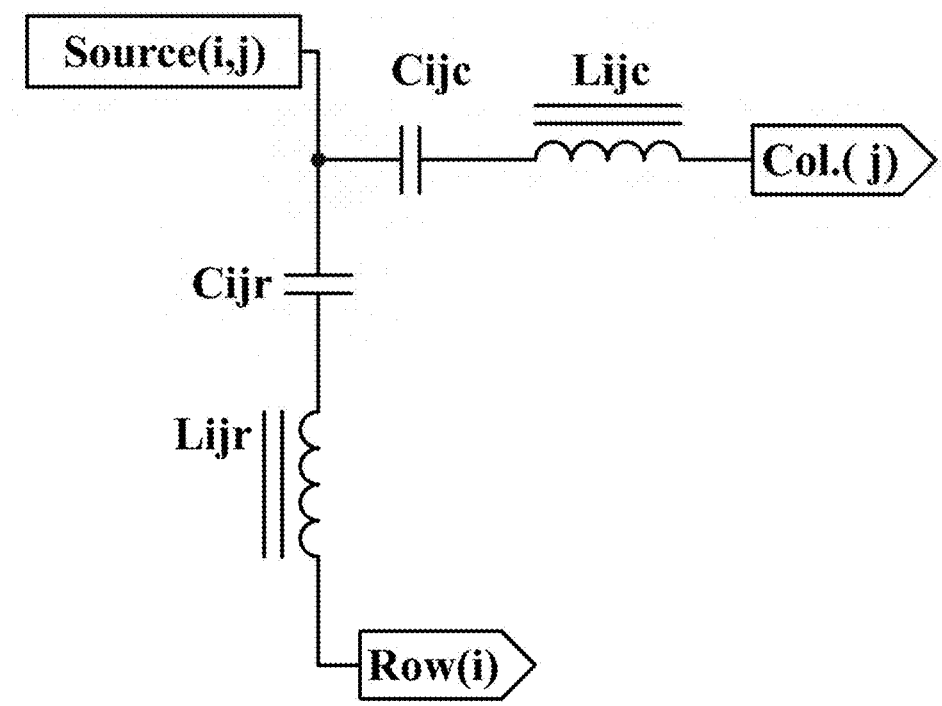
Figure 6:
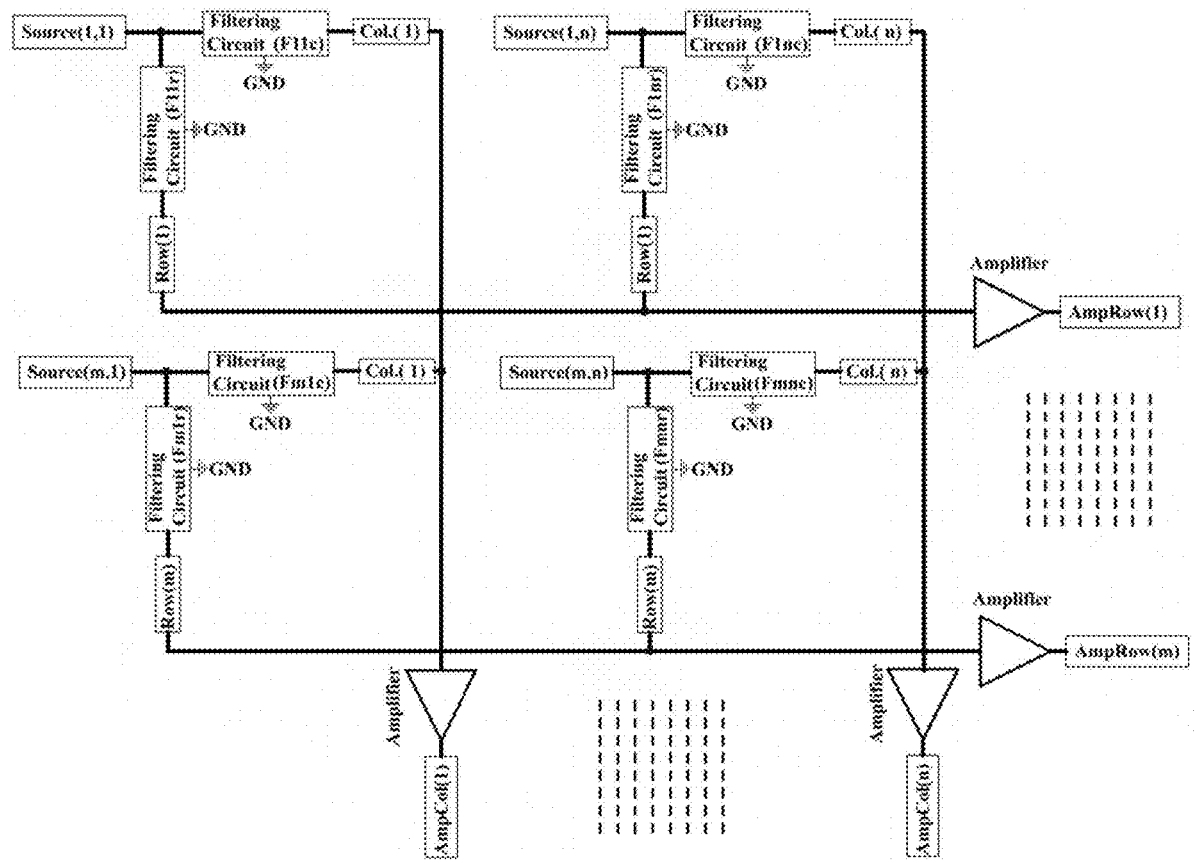
Figure 7:
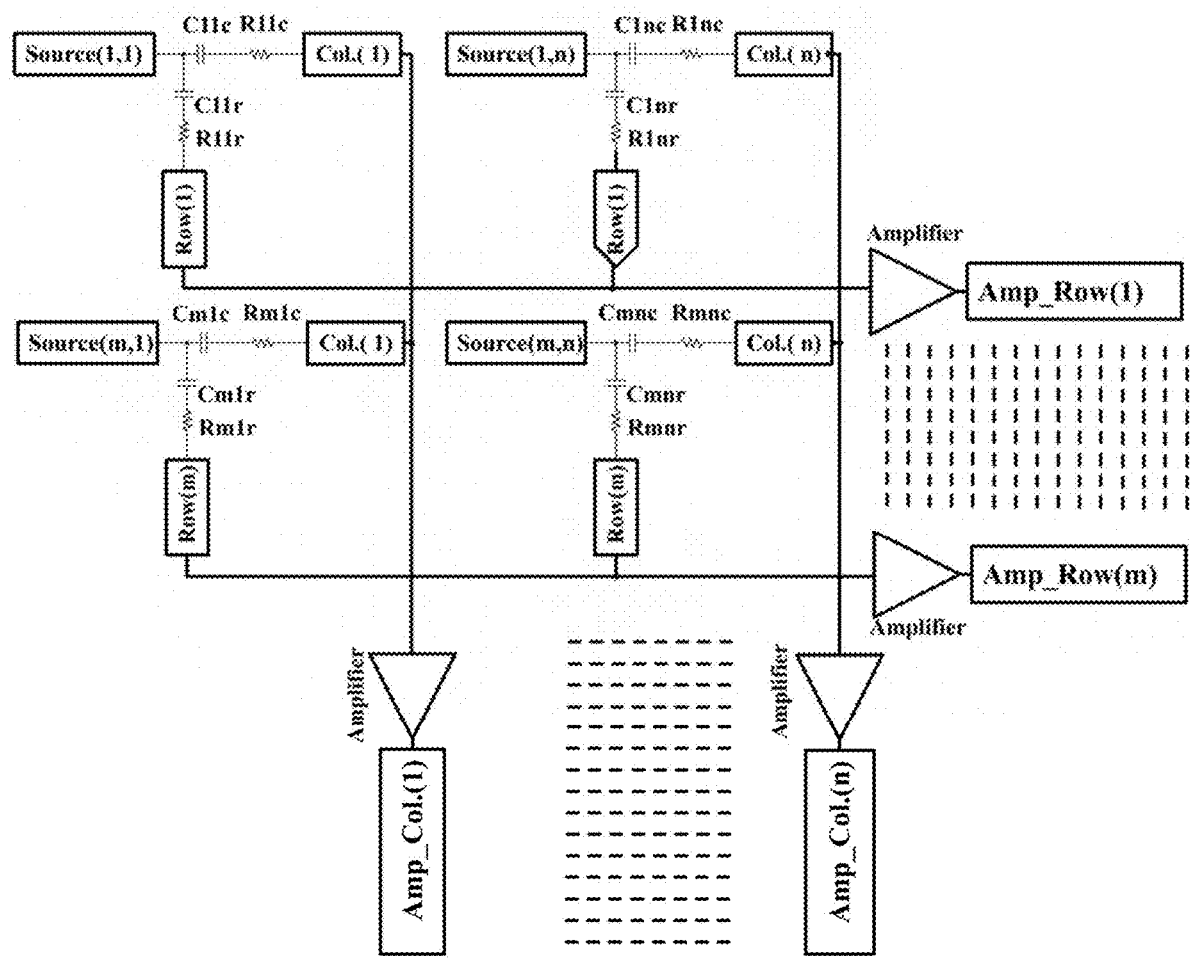
Figure 8:
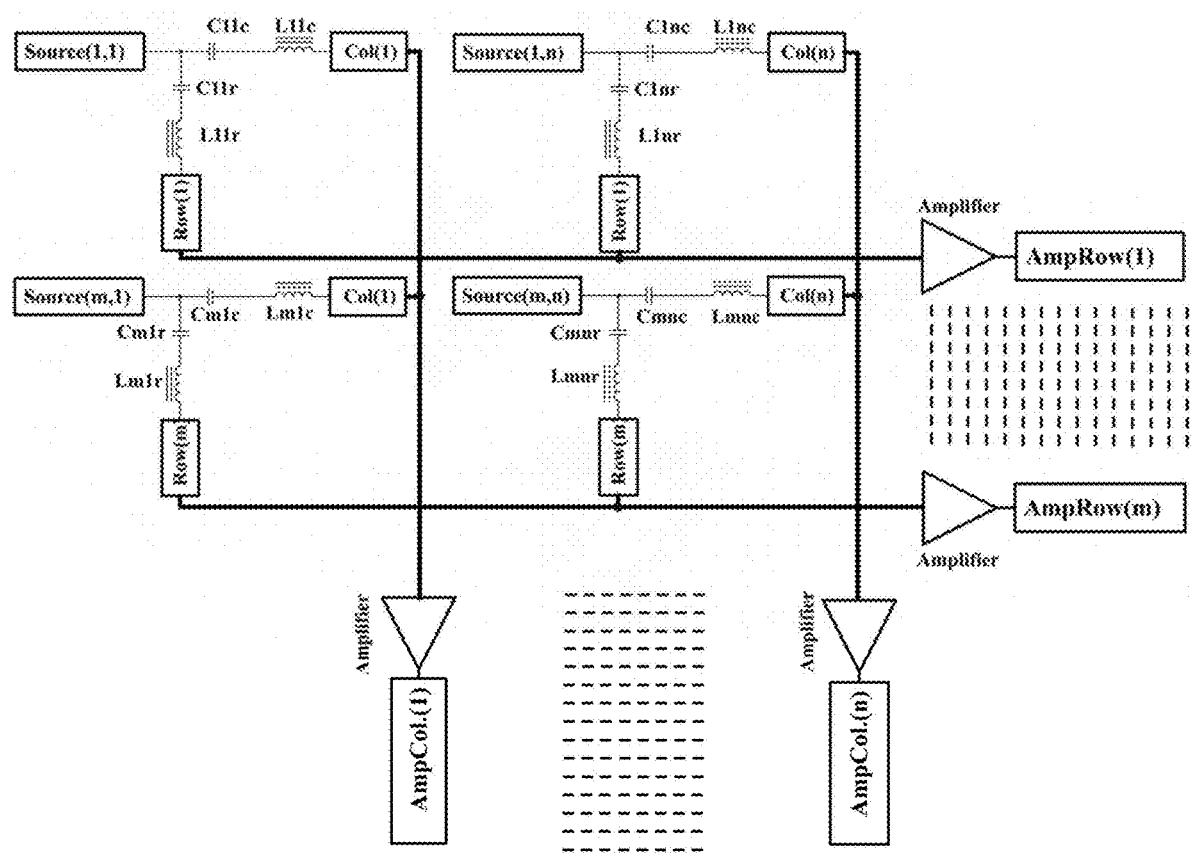
Figure 9:
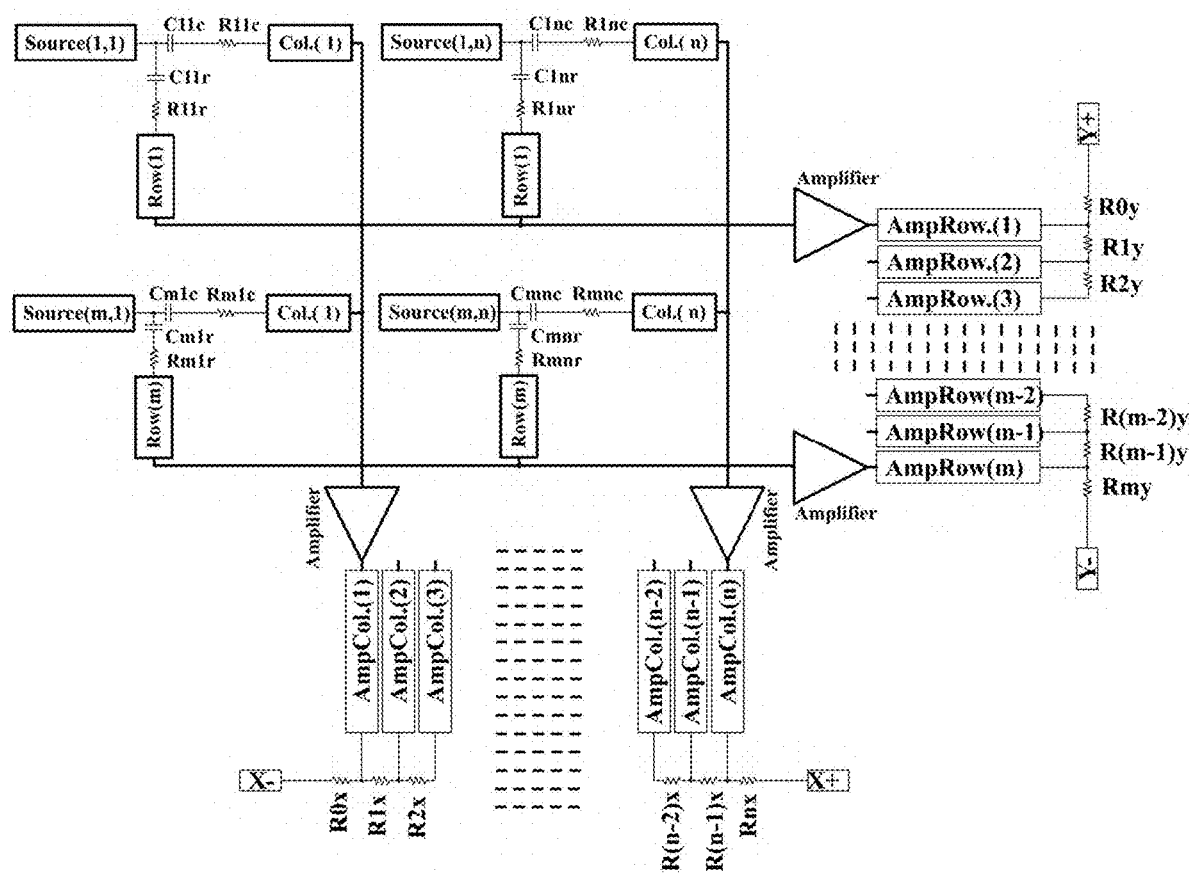
Figure 10:
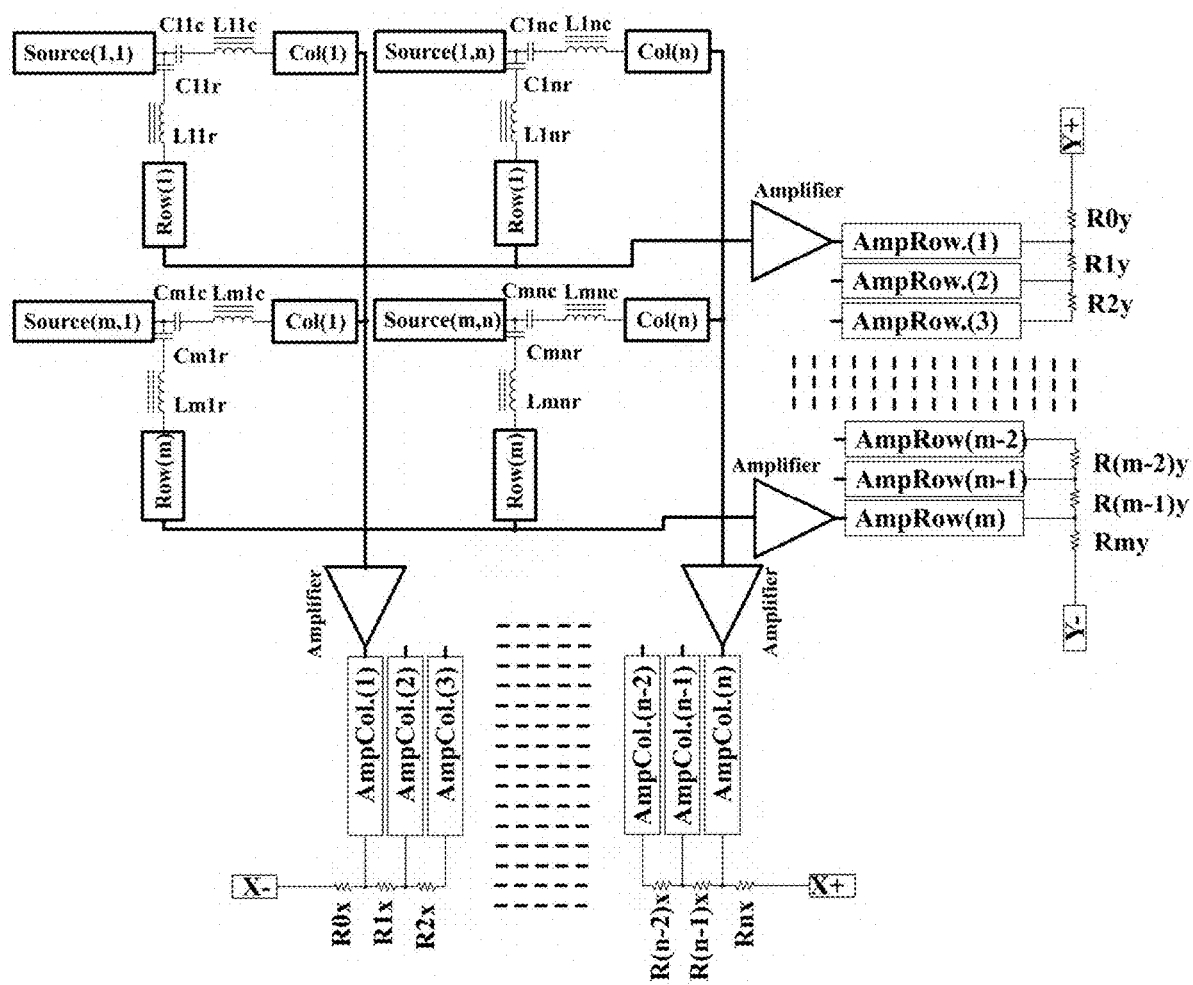
Figure 11A:
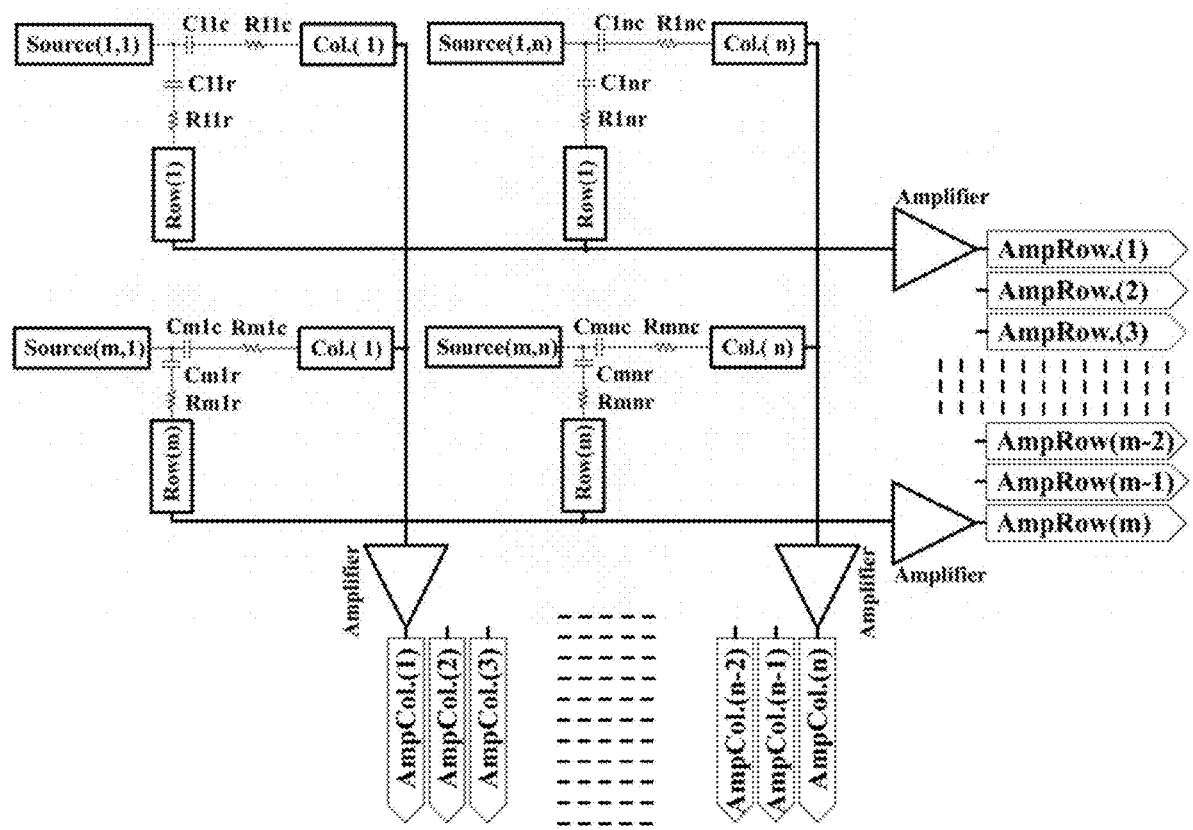
Figure 11B:
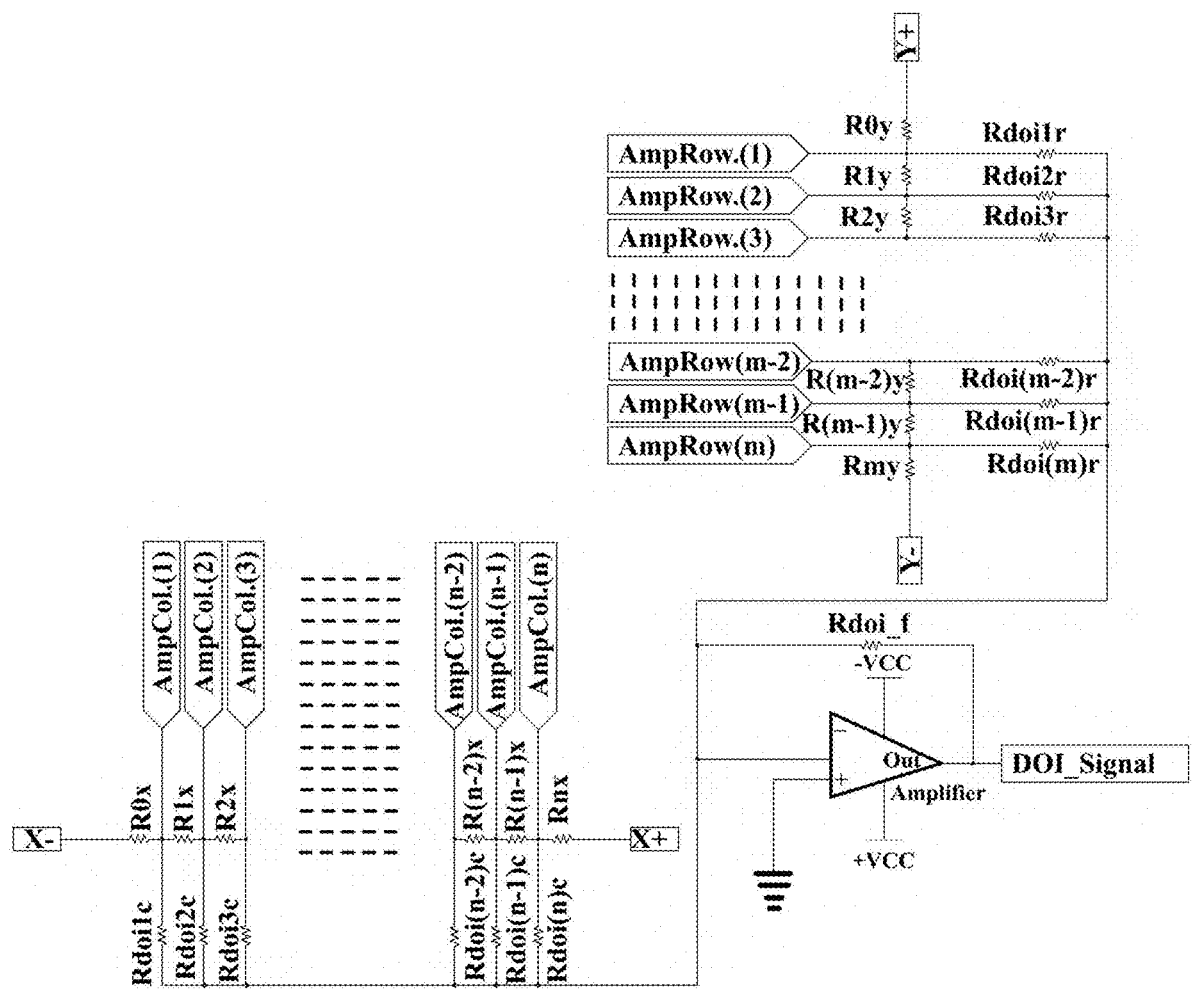
Figure 12A:
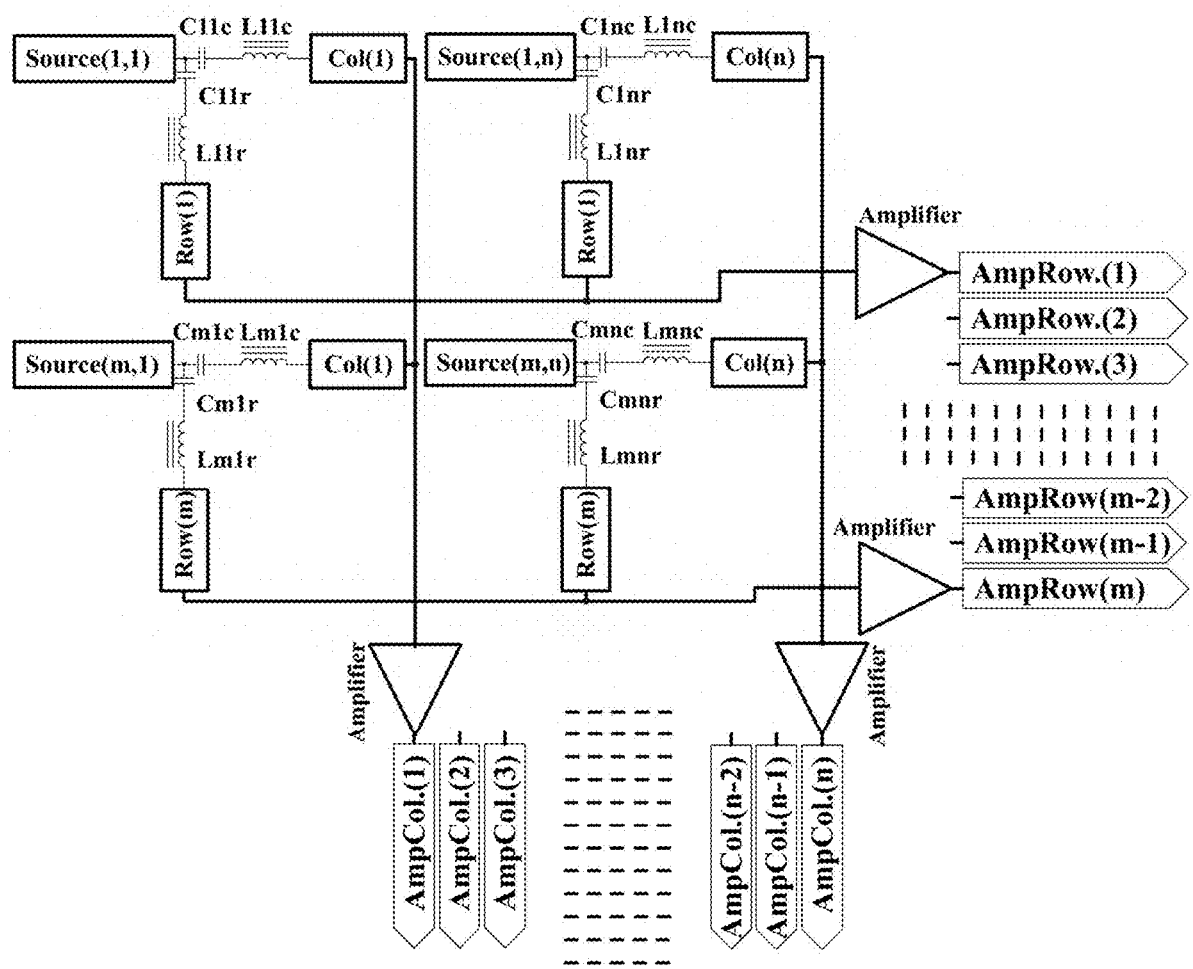
Figure 12B:
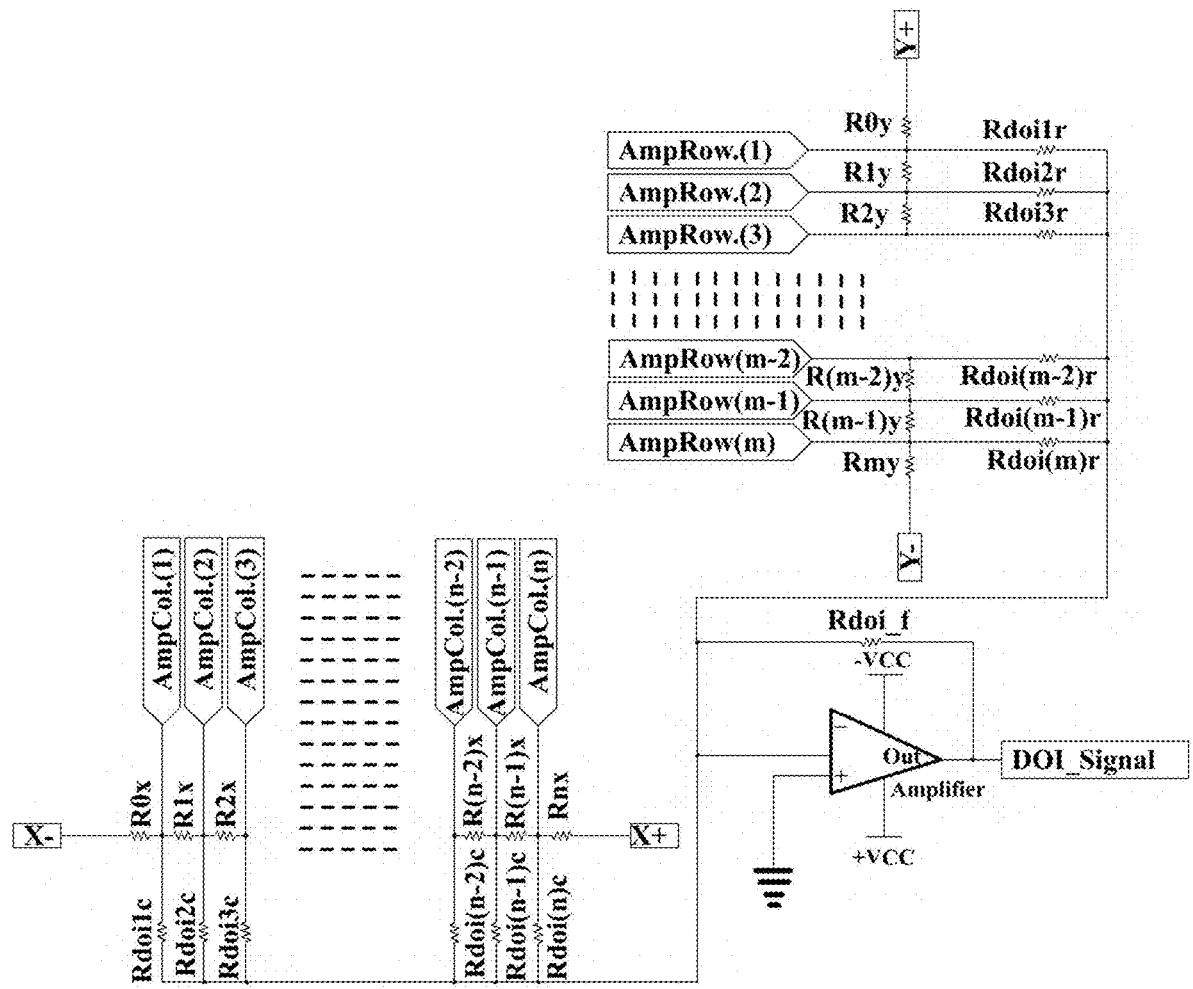

FIG. 4B is an example of using a single OpAmp for mixing the multiple input signals (Source(i, 1) . . . Source(i, n)), without interference with each other, and actively filtering of these input signals, producing a single amplified output for each row, AmpRow(i). The functioning of this circuit is similar to that described in FIG. 4A, but the passive components at the left part from the labeled "Middle point of the active filter" are distributed along all the matrix, thus we will divide this circuit for the description as conformed by two parts: the Left Part of the Active Filter, corresponding to what we called the Filtering circuits, and the Right Part of the Active Filter, corresponding to the circuitry of the OpAmp, AmplifierA, with its feedback loop resistor R_feedbac;

FIG. 4C is an example of using a single OpAmp for mixing the multiple input signals (Source(1, j) . . . Source(m, j)), without interference with each other, and actively filtering of these input signals, producing a single amplified output for each column, AmpCol(j). This circuit is divided in two parts in a similar way that FIG. 4B;

FIG. 4D is a simplified diagram of the right side of the circuit in FIG. 4C;

FIG. 4E is a simplified diagram of the right side of the circuit in FIG. 4B;

FIG. 5A is a block diagram of the filtering block, which is used as a basic building block of the readout network topology made of a pair of filtering circuits (constituting the left part of the active filters), that provide outputs divided in Rows and Columns to the subsequent amplification stage and Right Part of the active filters;

FIG. 5B is an exemplary filtering blocks, using a pair of filtering circuits with the configuration of a capacitor in series with a resistor;

FIG. 5C is an exemplary filtering blocks, using a pair of filtering circuits with the configuration of a capacitor in series with an inductor;

FIG. 6 is the general block diagram of the proposed filtering readout network topology of the present invention;

FIG. 7 is the schematic diagram of a proposed filtering readout network using a pair of CR filtering circuits to conform the filtering block;

FIG. 8 is the schematic diagram of a proposed filtering readout network using a pair of CL filtering circuits to conform the filtering block;

FIG. 9 is the schematic diagram of a proposed filtering readout network using a pair of CR filtering circuits to conform the filtering block, further comprising resistor chains at Columns and Rows terminals to apply the COG algorithm and reduce the output number from Row+Columns to only 4 signals;

FIG. 10 is the schematic diagram of a proposed filtering readout network using a pair of CL filtering circuits to conform the filtering block, further comprising resistor chains at Columns and Rows terminals to apply the COG algorithm and reduce the output number from Row+Columns to only 4 signals;

FIG. 11A is a first portion of the schematic diagram of a proposed filtering readout network using a pair of CR filtering circuits to conform the filtering block, further comprising two resistor chains at Columns and Rows terminals; the first resistor chain to apply the COG algorithm and reduce the output number from Row+Columns to only 4 signals, and the second resistor chain to obtain a variable dependent on the Depth of interaction (DOI) given by an additional signal;

FIG. 11B is a second portion of the schematic diagram of proposed filtering readout network using a pair of CR filtering circuits to conform the filtering block, further comprising two resistor chains at Columns and Rows terminals; the first resistor chain to apply the COG algorithm and reduce the output number from Row+Columns to only 4 signals, and the second resistor chain to obtain a variable dependent on the Depth of Interaction (DOI) given by an additional signal;

FIG. 12A is a first portion of the schematic diagram of a proposed filtering readout network using a pair of CL filtering circuits to conform the filtering block, further comprising two resistor chains at Columns and Rows terminals; the first resistor chain to apply the COG algorithm and reduce the output number from Row+Columns to only 4 signals, and the second resistor chain to obtain a variable dependent on the Depth of Interaction (DOI) given by an additional signal; and FIG. 12B is a second portion of the schematic diagram of a proposed readout network using a pair of CL filtering circuits to conform the filtering block, further comprising two resistor chains at Columns and Rows terminals; the first resistor chain to apply the COG algorithm and reduce the output number from Row+Columns to only 4 signals, and the second resistor chain to obtain a variable dependent on the Depth of Interaction (DOI) given by an additional signal.

In the figures, the initials or legends appearing therein, mean the following:

R=Row;
C=Column;
F=Filter output;
S=Source;
R_f=R_feedback;
Ro=R out;
AR=Amplifier Row;

AC=Amplifier Column); and

DOI=Depth of Interaction.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

Glossary

MOD: It is the acronym of Matrix Output Device and has the same conventional meaning as in the state of the art.

Filtering circuit: It is here a minimum circuit block with one input connection and one output connection, which may be selected from two models, the first model including a capacitor in series with a resistor and the second model including a capacitor in series with an inductor.

Filtering block: It is a basic building block of the readout network topology and its realizations. It is made of a pair of similar filtering circuits, one used to generate an output signal to be processed as container of row information and the other used to generate an output signal to be processed as container of column information.

Readout network topology: It is a generic block diagram of an electronic network, which could generate multiples specific circuitry realizations with a similar functioning.

Detector and detector block are expressions indistinctly used, and refer to the radiation detector block, which can be an X-ray detector or a gamma ray detector.

After reviewing all available readout network for Matrix Output Devices (MODs) and testing them, a new readout network topology is provided, specifically to overcome the issues related to the high noise level of the SiPMs, which appropriately operate with the requirements of a detector block conformed by a monolithic scintillator crystal plus a SiPMA. Of course, this new readout network topology (that can generate various readout network configurations) can work fine too (and better), with the MODs that are not as restrictive as SiPMAs. Each description and each embodiment of the present invention regarding SiPMA is assumed to be applicable in general to any MOD.

In order to appropriately deal with the noisy SiPMA output signals, in the present invention we propose a generic filtered readout network topology for Matrix Output Devices characterized by the spread of a replicated basic filtering block along the outputs of the whole matrix, each filtering block containing a pair of filtering circuits connected to each SiPM output by a common input connection, providing two separate, symmetrical and filtered outputs—one each filtering block—. These filtered outputs are further grouped by columns and rows to be later injected into amplifier circuit inputs to obtain actively filtered and amplified output signals, good enough to reproduce the planar impact position of the gamma ray in a monolithic crystal and the DOI if required.

Figure 1:
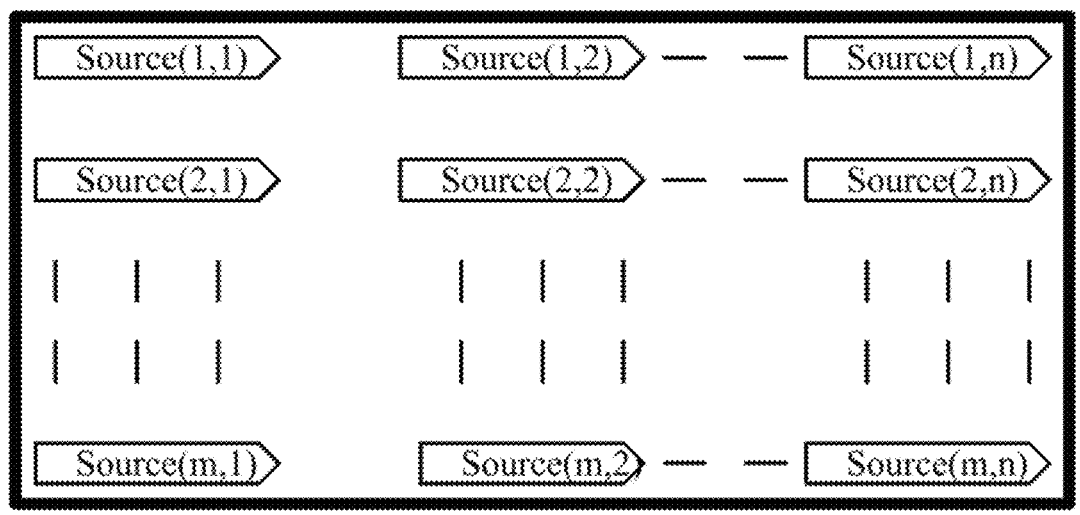
FIG. 1 is a schematic of the pinout of a generally known Matrix Output Device with "m" rows and "n" columns.

Regarding FIG. 1, it represents the schematic of the pinout of a general Matrix Output Device (MOD) with "m" rows and "n" columns, which is the target for the solution given by the present invention. The matrix outputs are current sources, thus, these were labeled accordingly and enumerated in the typical matrix form as Source(i, j), where "i" ranges from 1 to "m" and "j" ranges from 1 to "n". "m" is the number of rows and "n" is the number of columns.

Figure 2A:
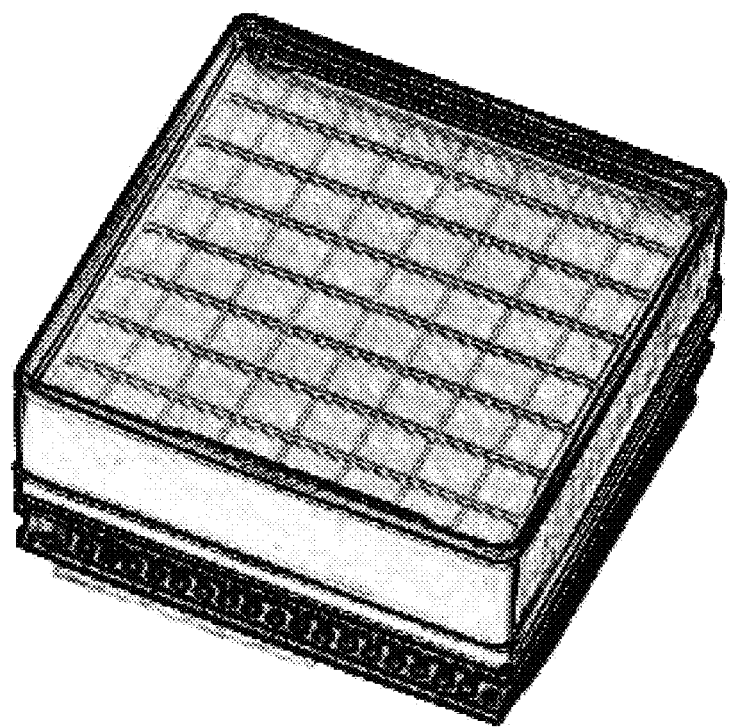
FIG. 2A shows an example of a PSPMT, with 8 Rows×8 Columns, representing a standard Matrix Output Devices (MOD)
Figure 2B:
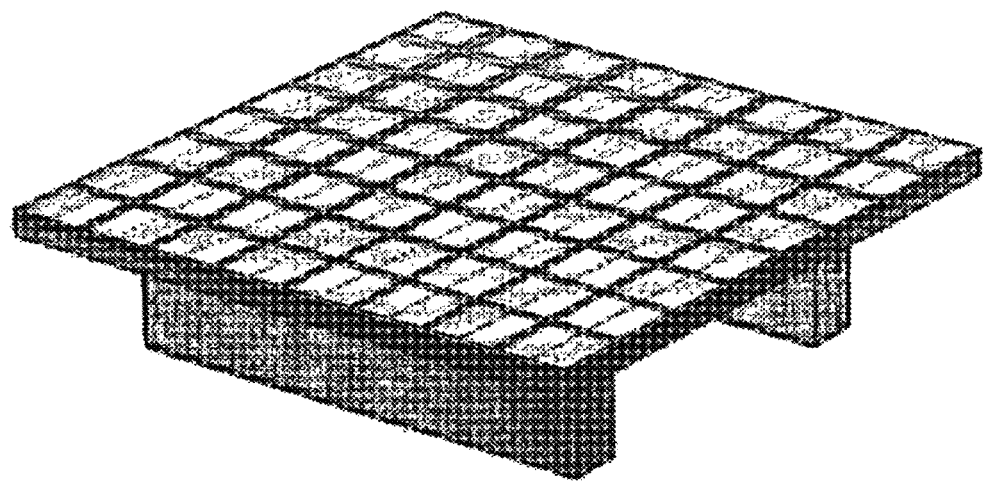
FIG. 2B shows an example of a SiPMA with 16 Rows×16 Columns, representing a standard Matrix Output Devices (MOD)

FIG. 2A is a PSPMT with 8 rows and 8 columns (64 outputs), while FIG. 2B is a SiPMA with 16 rows and 16 columns (256 outputs). Both are examples of matrix output devices and have output sets as shown in FIG. 1, which may benefit from the present invention in order to reduce the number of electronic channels required to reproduce the coordinates of the gamma rays detected at the scintillators coupled to these MODs.

Figure 3A:
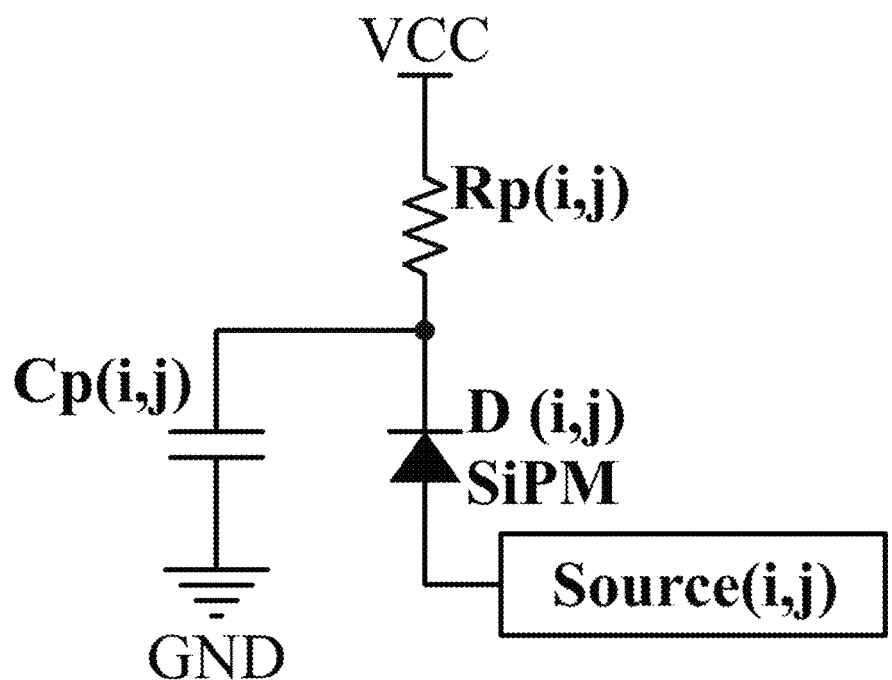
FIG. 3A shows a typical biasing circuit for a SiPM.
Figure 3B:
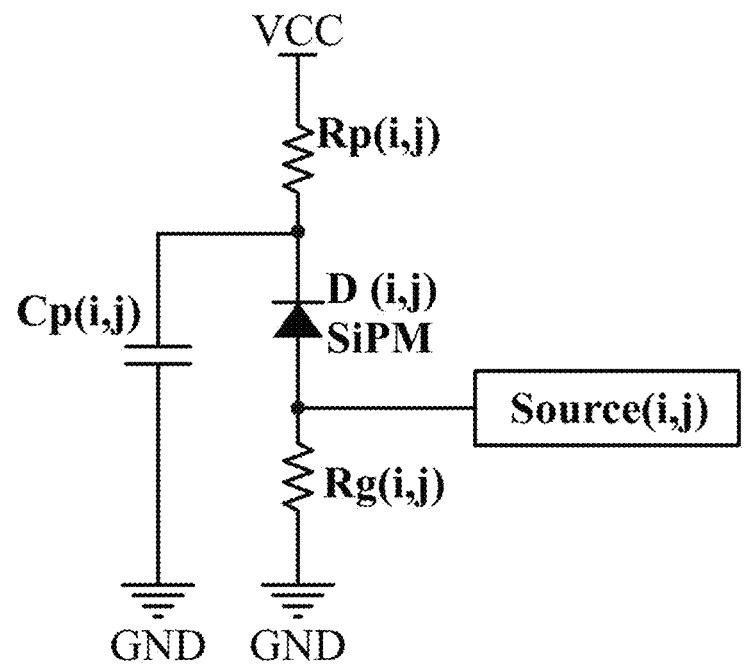
FIG. 3B shows a typical biasing circuit for a SiPM.

Each matrix element of the SiPMA is a SiPM that requires its own biasing as can be seen in FIG. 3A and FIG. 3B. The SiPM element Dij has a symbol of diode. It is biased in reversed polarity from Vcc across a limiting resistor Rp(ij). The capacitor Cp(i j), holds sufficient charge to provide the output current when the SiPM opens after a nuclear event appears. The output labeled as Source(i, j) in the circuit of FIG. 3A requires a low impedance current mode connection, while the same output in the circuit of FIG. 3B requires voltage mode connection, because this latter one includes the resistor Rg(ij), which drains the SiPM current, producing a voltage source instead of a current.

Our goal is to provide a readout network to deal with the uncountable MODs outputs (labeled in the form Source(i, j) in FIG. 1, where "i" ranges from 1 to "m" and "j" ranges from 1 to "n", being "m" the number of rows and "n" the number of columns) and be able to reproduce the original coordinates of the impact in the scintillator, and doing it even for very noisy devices such as SiPMA.

In the present invention we use extensively, by simplicity, the concept of SiPMA as a specific example of a MOD, but in all cases it should be understood that it is applicable in general to any type of MOD.

A good way to filter the uncountable SiPMA outputs could be to include active filtering at any output, Source(i, j), but this normally will involve the use of a replicable circuit (as the one in FIG. 4A) with the same number of OpAmps (m×n), which increases the circuit space, and power requirements, disregarding the cost. Furthermore, the number of filtered outputs is the same as the number of inputs (m×n), in such a way that, if we want to reduce them, we should include a further readout network (such as Popov, etc). That is why, an alternative circuit is proposed instead of replicating the circuit of FIG. 4A, for all the MOD outputs Source(i, j).

As it is known in the state of the art, a signal number reduction to rows plus columns is possible if appropriate mixing of signals is applied avoiding mutual interferences. To do that, we need to add the filtered signals of common rows on one side (FIG. 4B) and common columns on the other side (FIG. 4C). Taking advantage of the low impedance of the negative input of the OpAmp (labeled AmplifierA in both circuits) in an active filter configuration; we noted that it is possible to do the adding process (avoiding interferences with each other) at the middle point of the active filter, using a single OpAmp to actively filter all the signals incoming from various Left part filters that share the OpAmp, by means of injecting their currents together into the low impedance negative input of the OpAmp (FIG. 4B and FIG. 4C), that furthermore will add the currents of all the incoming signals. This circuit shares the OpAmp labeled as AmplifierA, and the passive component at the feedback loop of the OpAmp, labeled as R_feedback, while includes separate passive components in the input side (Ci1r, Ci2r, ..., Cinr in FIG. 4B and C1jc, C2jc, ..., Cmjc in FIG. 4C), receiving all the separate noisy signals (Source(i,l), to Source(i,n) in FIG. 4B and Source(l,j), to Source(m,j) in FIG. 4C) and injecting their currents together (added) in the negative input of the single OpAmp labeled as AmplifierA in both cases.

As explained, this functionality of the circuit makes it to look like if separate active filters were connected to each MOD output, therefore, in the descriptions below we will assume the existence of filters connected between each MOD output and the specific amplified rows: AmpRow(i) in FIG. 4B, and amplified columns: AmpCol(j) in FIG. 4C, without distinguishing that these are sharing part of the circuit.

After the assumption of the preceding paragraph and by simplicity, in the explanation of the subsequent drawings we will suppress the biasing and feedback loop components in the OpAmp circuits, in such a way that the right side of the circuits of FIG. 4B and FIG. 4C, from the labeled "middle point of the active filter", will be respectively replaced by the diagrams of FIG. 4E and FIG. 4D. At the same time, every circuit line of passive components horizontally deployed at the left part of the circuits of FIG. 4B and FIG. 4C, from the labeled "middle point of the active filter", will be named as "filtering circuit" in the description below. Furthermore, this filtering circuit may be of the type (Cijr-Rijr or CijcRijc) shown in FIG. 5B or (CijrLijr or CijcLijc) shown in FIG. 5C, and thus represented as generic boxes—Fijc, Fijr in FIG. 5A—too.

In the present invention, we propose a generic filtered readout network topology for Matrix Output Devices, composed by the spread of a basic "filtering block" along the outputs of the whole matrix, working together with a set of amplifier circuits that meet the following:

1. If the size of the MOD matrix is "m" rows and "n" columns, (m×n), such as that which pinout is shown in FIG. 1, then we can conform the whole readout network by the spread of the filtering block along the matrix outputs Source (i, j), provided that the variable "i" ranges from 1 to "m", while "j" ranges from 1 to "n". FIG. 6 represents the diagram of a general embodiment of the proposed readout network.

2. The filtering block contains a pair of filtering circuits (FIG. 5A), connectable to any MOD output by the common input connection that can be seen at the top left corner, labeled as Source(i, j), extracting two separate, symmetrical and filtered outputs labeled as Col. (j) at the top right corner, and Row(i) at the bottom left corner.

3. As can be seen on FIG. 6, the number "n" of different output signals generated by the same number of filtering circuits for rows (Fijr), labeled as Row(i), are connected together and later injected into the low impedance input of the amplifiers, similar to the one in FIG. 4E, (the Right part of the active filter in FIG. 4B) and represented at the right side of the diagram in FIG. 6, where the corresponding amplified and filtered output signals are labeled as AmpRow (i).

4. In a similar way of previous point 3, (speaking of FIG. 6) the number "m" of different output signals generated by the same number of filtering circuits for columns (Fijc), labeled as Column(j), are connected together and later injected into the low impedance input of the amplifiers, similar to the one in FIG. 4D, (the right part of the active filter in FIG. 4C) and represented at the bottom side of the diagram in FIG. 6, where the corresponding amplified and filtered output signals are labeled as AmpCol.(j).

5. What we consider "the readout network outputs" in FIG. 6, are the amplified outputs related to all Rows and Columns of the matrix, being Rows+Columns equal to the output channel number of the readout network. These outputs are located at the bottom and right sides of the schematics in FIG. 6, as well as in FIG. 7 and FIG. 8, and are labeled as AmpRow(i) and AmpCol.(j).

6. An appropriated acquisition and digitizing electronics for the "m+n" channels is required and specific software to process all digitized signals and provide planar positioning of the detected rays (gamma or X) and DOI, if required.

As a result of the functioning of the described readout network in FIG. 6, the filtering circuits working together with the OpAmp circuits conform an equivalent "active filter network" with the ability to attenuate the noisy signals reaching the readout network inputs from the MOD outputs Source(i, j), while the real signals from nuclear events are passed through the circuitry without attenuation and are symmetrically directed only to its specific "Row(i) output" and its specific "Column(j) output", without interfering with each other and further amplified to generate the corresponding amplified and filtered signals AmpRow(i) and AmpCol. (j).

The more simple and effective filtering circuits to conform the filtering block mentioned in the previous general description are the CR filter presented in FIG. 5B and the CL filter presented in FIG. 5C. Such combinations reduce the offset variation caused by temperature variations and noise coming from electronics. In all the previous descriptions, the diagram of FIG. 5A can be replaced by the circuits shown in FIG. 5B and FIG. 5C. In this way we will describe specific embodiments of the present invention.

In the preferred embodiment, the filtering circuit is composed by a Capacitor in series with a Resistor, to conform the filtering block shown in FIG. 5B. It is easy to obtain the new circuit from FIG. 6, by replacing the general filtering block (as FIG. 5A), attached to each Source(i, j), by the specific "CR based" filtering circuit of FIG. 5B. The result is the schematic of the FIG. 7. The signals from a specific MOD output, Source (i, j) are symmetrically divided in two components that will not interfere with each other, neither with any other arriving signal from a different MOD output. One of the two components is treated by the "High Pass filter" created by the passive components Cijc, Rijc and R_Feedback and the Amplifier with output AmpCol(j), (see FIG. 4C too). The cutting frequency of the filter is given by the parameter Cijc×R_Feedback, although the maximum gain is limited by the ratio R_Feedback/Rijc, to increase the circuit stability. The other one of the two components is treated by the "High Pass filter" created by the passive components Cijr, Rijr and R_Feedback and the Amplifier with output AmpRow(i), (see FIG. 4B too). The cutting frequency of the filter is given by the parameter Cijr× R_Feedback, although the maximum gain is limited by the ratio R_Feedback/Rijr, to increase the circuit stability.

In an alternative embodiment, the filtering circuit is composed by a Capacitor in series with an Inductor, to conform the filtering block shown in FIG. 5C. It is easy to obtain the new circuit from FIG. 6, by replacing the general filtering block (as FIG. 5A), attached to each Source(i, j), by the specific "CL based" filtering circuit of FIG. 5C. The result is the schematic of the FIG. 8. The signals from a specific MOD output, Source (i, j) are symmetrically divided in two components that will not interfere with each other, neither with any other arriving signal from a different MOD output. One of the two signal components is treated by the "Band Pass filter" created by the passive components Cijc, Lijc and R_Feedback and the Amplifier with output AmpCol (j). The central frequency of the filter is given by the parameter $C_{ijc} \times L_{ijc}$. Fortunately, $L_{ijc}$ has the parasitic resistance $R(L_{ijc})$ which limits the maximum gain to the ratio R_Feedback/$R(L_{ijc})$, to increase the circuit stability. The other one of the two signal component is treated by the "Band Pass filter" created by the passive components $C_{ijr}$, $L_{ijr}$ and R_Feedback and the Amplifier with output AmpRow(i). The center frequency of the filter is given by the parameter $C_{ijr} \times L_{ijr}$. And the maximum gain is limited by the ratio R_Feedback/$R(L_{ijr})$, increasing the circuit stability. Being $R(L_{ijr})$ the parasitic resistance of the inductor $L_{ijr}$.

In the preferred embodiment of the present invention, the SiPMA (or MOD in general) is optically coupled to a monolithic scintillator crystal. The readout network inputs (Source(i, j) (using the circuit of FIG. 7), "i" ranges 1 to m; "j" ranges 1 to n) are connected to the matrix outputs of the SiPMA (as seen in FIG. 1 also labeled as (Source(i, j)), and the two types of filtering circuit component outputs (divided in rows and columns) are connected to the low impedance inputs of the amplifiers that complete the active filtering functionality of the network. The amplified signals, labeled as AmpRow(i) and AmpCol. (j); (i ranges 1 to m and "j" ranges 1 to n) reach a number equal to the sum of columns and rows, and can be later processed analogically or digitally to obtain the planar impact position of the gamma ray in the monolithic scintillator crystal and the DOI if required. In this preferred embodiment, what we consider "the network outputs" are the amplifiers outputs related to all Rows and Columns of the matrix, being Rows+Columns equal to the output channel number of the readout network. These outputs are located at the bottom and right sides of the schematic in FIG. 7, and labeled as AmpRow(i) and AmpCol.(j).

An alternative embodiment can be obtained from a previous preferred embodiment by replacing the circuit of FIG. 7 by the circuit of FIG. 8. The SiPMA is optically coupled to a monolithic scintillator crystal. The readout network inputs (Source(i, j) (using the circuit of FIG. 8), "i" ranges 1 to m; "j" ranges 1 to n) are connected to the matrix outputs of the SiPMA (as seen in FIG. 1 also labeled as (Source(i, j)), and the two types of filtering circuit component outputs (divided in rows and columns) are connected to the low impedance inputs of the amplifiers that complete the active filtering functionality of the network. The amplified signals, labeled as AmpRow(i) and AmpCol.(j); (i ranges 1 to m and "j" ranges 1 to n) reach a number equal to the sum of columns and rows), and can be later processed analogically or digitally to obtain the planar impact position of the gamma ray in the monolithic crystal and the DOI if required. The network outputs are located here too at the bottom and right sides of the schematic in FIG. 8, and labeled as AmpRow(i) and AmpCol.(j).

In both cases, preferred or alternative embodiments, an appropriated acquisition and digitizing electronics for the "m+n" channels is required and specific software to process all signals and provide planar positioning of the detected ray (gamma or X) and DOI if required.

In alternative embodiments (FIG. 9 and FIG. 10), starting with the previous preferred and alternative embodiments of FIG. 7 and FIG. 8; and based on the previous art (i. e. Popov), the amplified signals (AmpRow(i) and AmpCol. (j)) can be connected to a pair of divider resistor chains (one for Rows, shown at right side, and the other for Columns, shown at bottom side) to reduce the output quantity to 4 and be able to apply the COG algorithm. The resistor chain established to calculate X coordinate, located at bottom side, is labeled R0x, R1x, R2x, . . . , Rnx, and the outputs at its edges are labeled "X−" and "X+". In a similar way, the resistor chain established to calculate Y coordinate, located at right side, is labeled R0y, R1y, R2y, . . . , Rmy, and the outputs at its edges are labeled "Y−" and "Y+".

The value for X position can be calculated as X=(X+)−(X−)/((X+)+(X−)) and the value for "y" position can be calculated as Y=(Y+)−(Y−)/((Y+)+(Y−)).

Assuming that a continuous scintillator crystal is coupled to the SiPMA, the gamma rays impinging the scintillator will produce a distribution of light over the SiPMA, activating a lot of SiPMs each time, which allows obtaining, not only the planar coordinates where the gamma ray reaches the scintillator, but also the DOI of the gamma ray inside the scintillator. This task can be done on real time, applying the analog processing described by [Christoph] and digitizing just one signal representing the DOI, or can be accomplished reading and digitizing the individuals signals of every row and column and determining the light shape and its corresponding DOI.

In alternative configurations (FIG. 11 and FIG. 12), starting with the previous two alternative embodiments of FIG. 9 and FIG. 10; and based on the previous art (i.e. Christoph), a further pair of resistor chains (one for Rows, shown at right side, and the other for Columns, shown at bottom side) can be connected by the input side to the nodes of both previous resistor chains (tied to all AmpRows(i) and AmpCol. (j) outputs) and can be connected by the output side to an electronic adding circuit (labeled AmpB) that makes up all the voltages at those nodes to obtain analogically an additional signal representing DOI and labeled as DOI Signal.

In this latter configuration only 5 signals are digitized to provide the gamma ray three-dimensional impact positioning. (X+, X−, Y+, Y−, and DOI Signal).

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A readout network topology for a Matrix Output Device with a plurality of matrix outputs given by the cross combination of "m" rows and "n" columns, labeled as Source(i, j), wherein "i" ranges 1 to m and "j" ranges 1 to n, the readout network topology comprising a basic frequency filtering block, replicated for each of the matrix outputs, and separately assigned to each matrix output; wherein:

each frequency filtering block includes a pair of filtering circuits having a common input connection to its assigned matrix output and providing two separate, symmetrical and filtered outputs labeled Col. (j) and Row(i);

all the Row(i) outputs incoming from the same row "i", but different columns are connected together to the low impedance input of an amplifier linked to the "i" row, that completes the active filtering and the mixing topology of the whole path, giving rise to the corresponding AmpRow(i) output; and all the Column(j) outputs incoming from the same column "j", but different rows, are connected together to the low impedance input of an amplifier linked to the "j" column, that completes the frequency active filtering and the mixing topology of the whole path, giving rise to the corresponding AmpCol(j) output, wherein the frequency filtering block is made of either a pair of CR Filtering Circuits or a pair of CL Filtering Circuits.

2. The readout network topology according to claim 1, wherein the different common outputs of the Filtering blocks, for rows, Row(i), and for columns, Column(j), are connected to amplifier circuits of the types "of charge" or "of current", with low input impedance, compared with the impedance of the Filtering circuit, being at least 10 times lower.

3. The readout network topology according to claim 1, wherein the different common outputs of the filtering blocks, for rows, Row(i), and for columns, Column(j), are connected to the negative inputs of the amplifier circuits and a resistor is used in a feedback loop between an output of an OpAmp in the amplifier circuit and its negative input.

4. The readout network topology according to claim 1, wherein a totality of the different common outputs of the Filtering blocks, for rows, Row(i), and for columns, Column (j), represents a totality of outputs of the detector to be digitized.

5. The readout network topology according to claim 1 wherein different Amplifier outputs for rows, AmpRow(i) and for columns, AmpCol(j), represent outputs of a detector to be digitized.

6. The readout network topology according to claim 5 wherein a first resistor chain interconnects the outputs of all rows AmpRow(i) and a second resistor chain interconnects the outputs of all columns, AmpCol(j); the ends of the resistor chains enable to extract directly, in real time, the "x" and "y" position by means of a Center of Gravity algorithm.

7. The readout network topology according to claim 6 wherein an adding circuit is provided to add the signals obtained at the different interconnection points of the resistor chain for rows, AmpRow(i), and for columns, AmpCol (j), the values of which are used to obtained a Depth of Interaction (DOI), inside a continuous crystal coupled to the matrix output device.

8. The readout network topology of claim 1 wherein the matrix output device is selected from a SiPMA matrix.

9. The readout network topology of claim 1, wherein the matrix output device is coupled to continuous monolithic scintillator crystals, or pixelated scintillators.

10. A matrix output device comprising the readout network topology with a plurality of matrix outputs given by the cross combination of "m" rows and "n" columns, labeled as Source(i, j), wherein "i" ranges 1 to m and "j" ranges 1 to n, the readout network topology comprising a basic frequency filtering block, replicated for each of the matrix outputs, and separately assigned to each matrix output; wherein:

each frequency filtering block includes a pair of filtering circuits having a common input connection to its assigned matrix output and providing two separate, symmetrical and filtered outputs labeled Col. (j) and Row(i);

all the Row(i) outputs incoming from the same row "i", but different columns are connected together to the low impedance input of an amplifier linked to the "i" row, that completes the active filtering and the mixing topology of the whole path, giving rise to the corresponding AmpRow(i) output; and all the Column(j) outputs incoming from the same column "j", but different rows, are connected together to the low impedance input of an amplifier linked to the "j" column, that completes the frequency active filtering and the mixing topology of the whole path, giving rise to the corresponding AmpCol(j) output, wherein the frequency filtering block is made of either a pair of CR Filtering Circuits or a pair of CL Filtering Circuits.

11. The matrix output device according to claim 10 is a SiPMA matrix.

12. The matrix output device according to claim 11 that is a SiPMA that is coupled to a monolithic crystal.

13. The matrix output device according to claim 10 that is coupled to continuous monolithic scintillation crystals.

14. A detector block characterized in that it comprises a matrix output device, which comprises a readout network topology with a plurality of matrix outputs given by the cross combination of "m" rows and "n" columns, labeled as Source(i, j), wherein "i" ranges 1 to m and "j" ranges 1 to n, the readout network topology comprising a basic frequency filtering block, replicated for each of the matrix outputs, and separately assigned to each matrix output; wherein:

each frequency filtering block includes a pair of filtering circuits having a common input connection to its assigned matrix output and providing two separate, symmetrical and filtered outputs labeled Col. (j) and Row(i);

all the Row(i) outputs incoming from the same row "i", but different columns are connected together to the low impedance input of an amplifier linked to the "i" row, that completes the active filtering and the mixing topology of the whole path, giving rise to the corresponding AmpRow(i) output; and all the Column(j) outputs incoming from the same column "j", but different rows, are connected together to the low impedance input of an amplifier linked to the "j" column, that completes the frequency active filtering and the mixing topology of the whole path, giving rise to the corresponding AmpCol(j) output, wherein the frequency filtering block is made of either a pair of CR Filtering Circuits or a pair of CL Filtering Circuits.

15. The detector block according to claim 14, wherein the matrix output device is a SiPMA.

16. The detector block according to claim 14, wherein the matrix output device is coupled to a continuous monolithic scintillation crystal or a pixelated scintillation crystal.

17. The detector block according to claim 16, wherein the matrix output device is a SiPMA and is coupled to a continuous monolithic crystal.

18. A process for obtaining images generated by X-ray sources or gamma ray sources comprising detecting the X-ray or gamma ray, and processing the signal obtained by means of a readout network topology with a plurality of matrix outputs given by the cross combination of "m" rows and "n" columns, labeled as Source(i, j), wherein "i" ranges 1 to m and "j" ranges 1 to n, the readout network topology comprising a basic frequency filtering block, replicated for each of the matrix outputs, and separately assigned to each matrix output; wherein:

each frequency filtering block includes a pair of filtering circuits having a common input connection to its assigned matrix output and providing two separate, symmetrical and filtered outputs labeled Col. (j) and Row(i);

all the Row(i) outputs incoming from the same row "i", but different columns are connected together to the low impedance input of an amplifier linked to the "i" row, that completes the active filtering and the mixing topology of the whole path, giving rise to the corresponding AmpRow(i) output; and all the Column(j) outputs incoming from the same column "j", but different rows, are connected together to the low impedance input of an amplifier linked to the "j" column, that completes the frequency active filtering and the mixing topology of the whole path, giving rise to the corresponding AmpCol(j) output, wherein the frequency filtering block is made of either a pair of CR Filtering Circuits or a pair of CL Filtering Circuits.

19. The process of claim 18, wherein the readout network topology is included in a matrix output device.

20. The process of claim 18, wherein the matrix output device is comprised in a detector block.

* * * * *